(12) United States Patent
Shiokawa et al.

(10) Patent No.: US 11,407,163 B2
(45) Date of Patent: Aug. 9, 2022

(54) BLOW MOLDING DEVICE

(71) Applicant: YOSHINO KOGYOSHO CO., LTD., Tokyo (JP)

(72) Inventors: Mitsuru Shiokawa, Tokyo (JP); Hideaki Hoshino, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 27 days.

(21) Appl. No.: 16/964,728

(22) PCT Filed: Dec. 4, 2018

(86) PCT No.: PCT/JP2018/044621
§ 371 (c)(1),
(2) Date: Jul. 24, 2020

(87) PCT Pub. No.: WO2019/150754
PCT Pub. Date: Aug. 8, 2019

(65) Prior Publication Data
US 2020/0353666 A1    Nov. 12, 2020

(30) Foreign Application Priority Data
Jan. 31, 2018   (JP) .............................. JP2018-015187

(51) Int. Cl.
| B29C 49/58 | (2006.01) |
| B29C 49/42 | (2006.01) |
| B29L 31/00 | (2006.01) |

(52) U.S. Cl.
CPC .......... B29C 49/58 (2013.01); B29C 49/4273 (2013.01); B29C 49/4289 (2013.01);
(Continued)

(58) Field of Classification Search
CPC . B29C 49/58; B29C 49/4273; B29C 49/4289; B29C 2049/4294;
(Continued)

(56) References Cited

U.S. PATENT DOCUMENTS

| 2014/0367895 A1 | 12/2014 | Sato et al. |
| 2015/0190975 A1 | 7/2015 | Yokobayashi et al. |

(Continued)

FOREIGN PATENT DOCUMENTS

| CN | 107614240 A | 1/2018 |
| JP | 2013-154603 A | 8/2013 |

(Continued)

OTHER PUBLICATIONS

Feb. 12, 2019 International Search Report issued in International Patent Application No. PCT/JP2018/044621.

(Continued)

*Primary Examiner* — Jeffrey M Wollschlager
*Assistant Examiner* — Shibin Liang
(74) *Attorney, Agent, or Firm* — Oliff PLC

(57) ABSTRACT

A blow molding device includes: a tubular-shaped nozzle; a tubular-shaped sealing body configured to be displaced between closing and opening positions; and a stretching rod surrounded by the sealing body. The sealing body includes a tubular wall, which has a drawing-in hole extending from one end to another end, the one end being open at a lower end of the tubular wall, and the other end being open at an outer circumferential surface of the tubular wall. The nozzle has a drawing-in path configured to communicate with the other end of the drawing-in hole when the sealing body is in the closing position. The blow molding device further includes a fluid drawing-in source configured to draw in the incompressive fluid from the drawing-in path.

8 Claims, 5 Drawing Sheets

(52) U.S. Cl.
CPC .......... *B29C 2049/4294* (2013.01); *B29C 2049/5803* (2013.01); *B29L 2031/7158* (2013.01)

(58) Field of Classification Search
CPC . B29C 2049/5803; B29C 49/12; B29C 49/46; B29C 49/4284; B29C 49/42; B29C 2049/429; B29C 49/62; B29C 2049/627; B29L 2031/7158
See application file for complete search history.

(56) References Cited

U.S. PATENT DOCUMENTS

| | | |
|---|---|---|
| 2016/0107366 A1 | 4/2016 | Gillet |
| 2016/0243748 A1 | 8/2016 | Tabata et al. |
| 2017/0217077 A1 | 8/2017 | Suyama et al. |
| 2018/0043606 A1* | 2/2018 | Morikami ............... B29C 49/46 |
| 2018/0290366 A1* | 10/2018 | Okuyama ............... B65D 1/00 |

FOREIGN PATENT DOCUMENTS

| | | | |
|---|---|---|---|
| JP | 2013-208834 A | 10/2013 | |
| JP | 2016-32922 A | 3/2016 | |
| JP | 2016-520015 A | 7/2016 | |
| WO | 2015/063983 A1 | 5/2015 | |
| WO | 2016/147531 A1 | 9/2016 | |
| WO | 2017/154430 A1 | 9/2017 | |
| WO | 2017090339 * | 9/2017 | ............. B29C 49/46 |

OTHER PUBLICATIONS

Aug. 3, 2021 Office Action issued in Chinese Patent Application No. 201880087597.4.
Sep. 15, 2021 Search Report issued in European Patent Application No. 18904449.8.
May 6, 2022 Office Action issued in Chinese Patent Application No. 201880087597.4.

* cited by examiner

BLOW MOLDING DEVICE

TECHNICAL FIELD

This disclosure relates to a blow molding device.

BACKGROUND

Synthetic resin-made containers, typical examples of which include a polypropylene (PP) bottle and a polyethylene terephthalate (PET) bottle, have been used to contain a variety of contents, such as a beverage, a cosmetic product, a pharmaceutical product, a detergent, and a toiletry including shampoo. Such a container is typically formed by heating a resin-made preform to a temperature at which a stretch effect may be achieved and biaxially stretch blow molding the heated preform into a predetermined shape with use of a blow molding device. The resin-made preform has been formed in a closed-bottom tubular shape, for example, by injection molding.

As is known, as a pressurized fluid to be supplied into the preform, such a blow molding device may use an incompressive fluid, such as a pressurized liquid, instead of pressurized air. In this case, using, as the pressurized fluid, a content that is to be filled in a container as a final product omits the step of filling the content to the container and simplifies the production process and the configuration of the blow molding device.

Patent Literature 1, for example, describes a blow molding device including: a mold in which a preform may be placed; a nozzle configured to engage to a mouth of the preform; a pressurized fluid supply source configured to supply a pressurized liquid to the nozzle; and a stretching rod configured to be displaced in an up-and-down direction. The described blow molding device is configured to supply the pressurized liquid into the preform to stretch the preform in a lateral (i.e., radial) direction concurrently with stretching the preform in a lengthwise (i.e., axial) direction with use of the stretching rod, thereby molding the preform into a container having a shape conforming to a cavity of the mold.

CITATION LIST

Patent Literature

PTL 1: JP2013-208834 A

SUMMARY

Technical Problem

In the conventional blow molding device as described in Patent Literature 1, when the nozzle is displaced upward and disengaged from a mouth of the container after blow molding, the liquid (e.g., incompressive fluid) adhered to a surface of the nozzle or a surface of the stretching rod sometimes drips down. Especially when a relatively highly viscous liquid, such as shampoo and a liquid detergent, is used as the incompressive fluid for blow molding, it takes a long time for the liquid to drip down from the nozzle or the like after blow molding, and moreover, the liquid continues to drip in a stringy form for a while. Accordingly, the liquid is likely to drip onto the molded container or the mold from which the container has been removed, possibly causing the problem of adhesion of the liquid thereto.

The present disclosure has been conceived in light of the above problem. It would thus be helpful to provide a blow molding device that is capable of preventing the incompressive fluid from dripping down from the nozzle when the nozzle is disengaged from the mouth after blow molding, and accordingly, is capable of preventing the fluid from adhering to the molded container or the mold.

Solution to Problem

An aspect of the present disclosure resides in a blow molding device, including: a tubular-shaped nozzle; a pressurized fluid supply source configured to supply a pressurized incompressive fluid to the nozzle; a tubular-shaped sealing body configured to be displaced in an up-and-down direction between a closing position in which the sealing body closes the nozzle and an opening position in which the sealing body opens the nozzle; and a stretching rod surrounded by the sealing body and configured to be displaced in the up-and-down direction. The sealing body includes a tubular wall having an outer circumferential surface configured to face the nozzle when the sealing body is in the closing position. The tubular wall is provided with a drawing-in hole extending from one end to another end, the one end being open at a lower end of the tubular wall, and the other end being open at the outer circumferential surface of the tubular wall. The nozzle is provided with a drawing-in path configured to communicate with the other end of the drawing-in hole when the sealing body is in the closing position. The blow molding device further includes a fluid drawing-in source configured to draw in the incompressive fluid from the drawing-in path.

In a preferred embodiment of the blow molding device according to the present disclosure configured as above, the tubular wall is provided with a plurality of the drawing-in holes arranged at an interval in a circumferential direction, and the outer circumferential wall of the tubular wall is provided with a circumferential groove to which the other end of each of the plurality of the drawing-in holes is open.

In another preferred embodiment of the blow molding device according to the present disclosure configured as above, the lower end of the tubular wall has an annular inclined surface around an entire circumference thereof, the annular inclined surface being inclined upward toward an inner side in a radial direction.

In yet another preferred embodiment of the blow molding device according to the present disclosure configured as above, the nozzle includes a tubular-shaped nozzle tip, and the lower end of the tubular wall is positioned flush with a lower end of the nozzle tip when the sealing body is in the closing position.

Advantageous Effect

The present disclosure provides a blow molding device that is capable of preventing the incompressive fluid from dripping from the nozzle when the nozzle is disengaged from the mouth after blow molding, and accordingly, is capable of preventing the fluid from adhering to the molded container or the mold.

DETAILED DESCRIPTION

With reference to the drawings, the present disclosure is illustrated in more details below.

Note that in the present disclosure an up-and-down direction refers to a vertical direction. Furthermore, in an embodiment of the present disclosure described below, a nozzle 7, a sealing body 11, and a stretching rod 16 have a common central axis line O, which extends along the up-and-down direction. In the present embodiment, a lengthwise section refers to a section taken along a plane including the central axis line O, and a cross section refers to a section taken along a plane perpendicular to the central axis line O.

Figure 1:
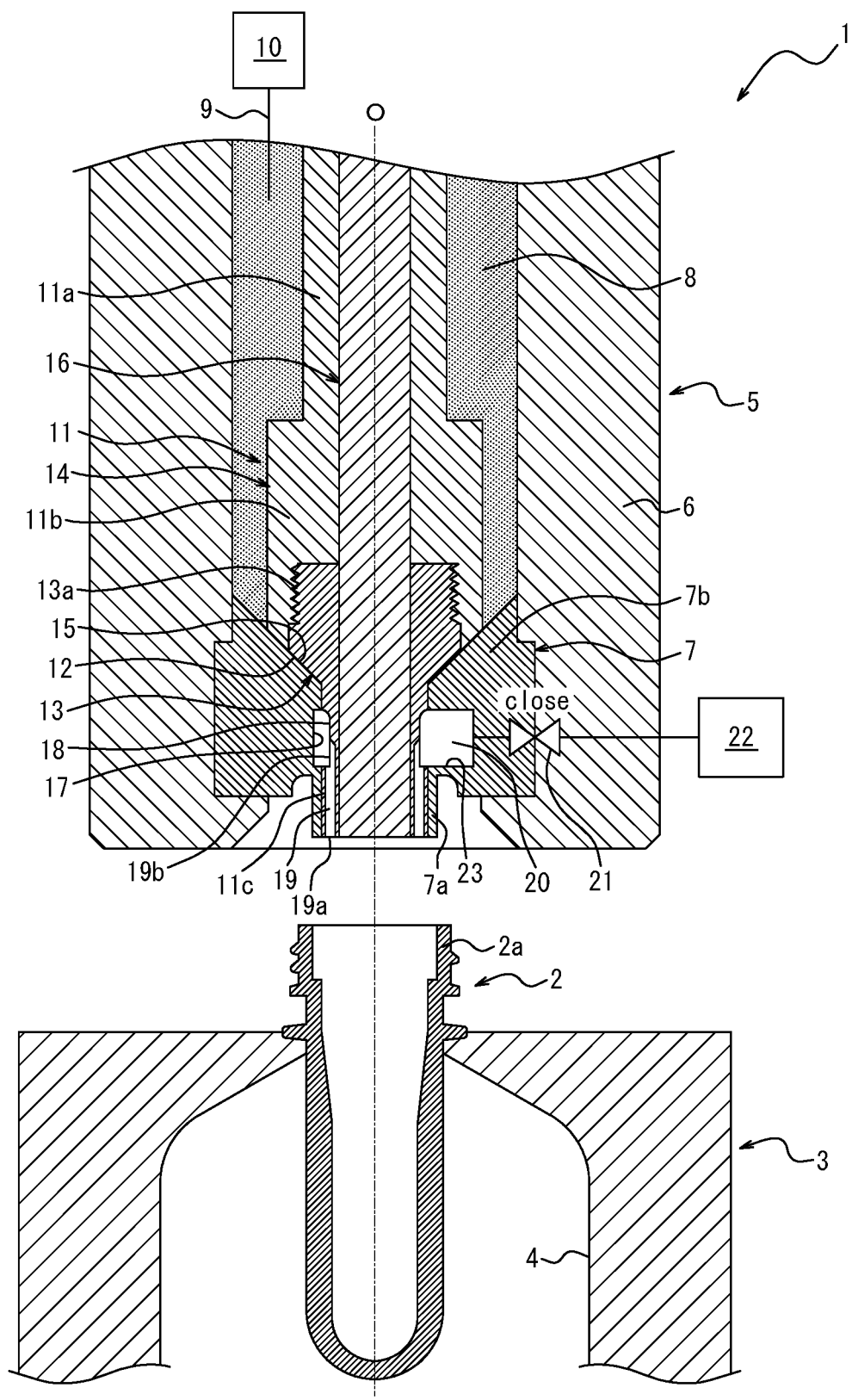
FIG. 1 is a lengthwise sectional view of a blow molding device in a standby state according to an embodiment of the present disclosure.
Figure 2:
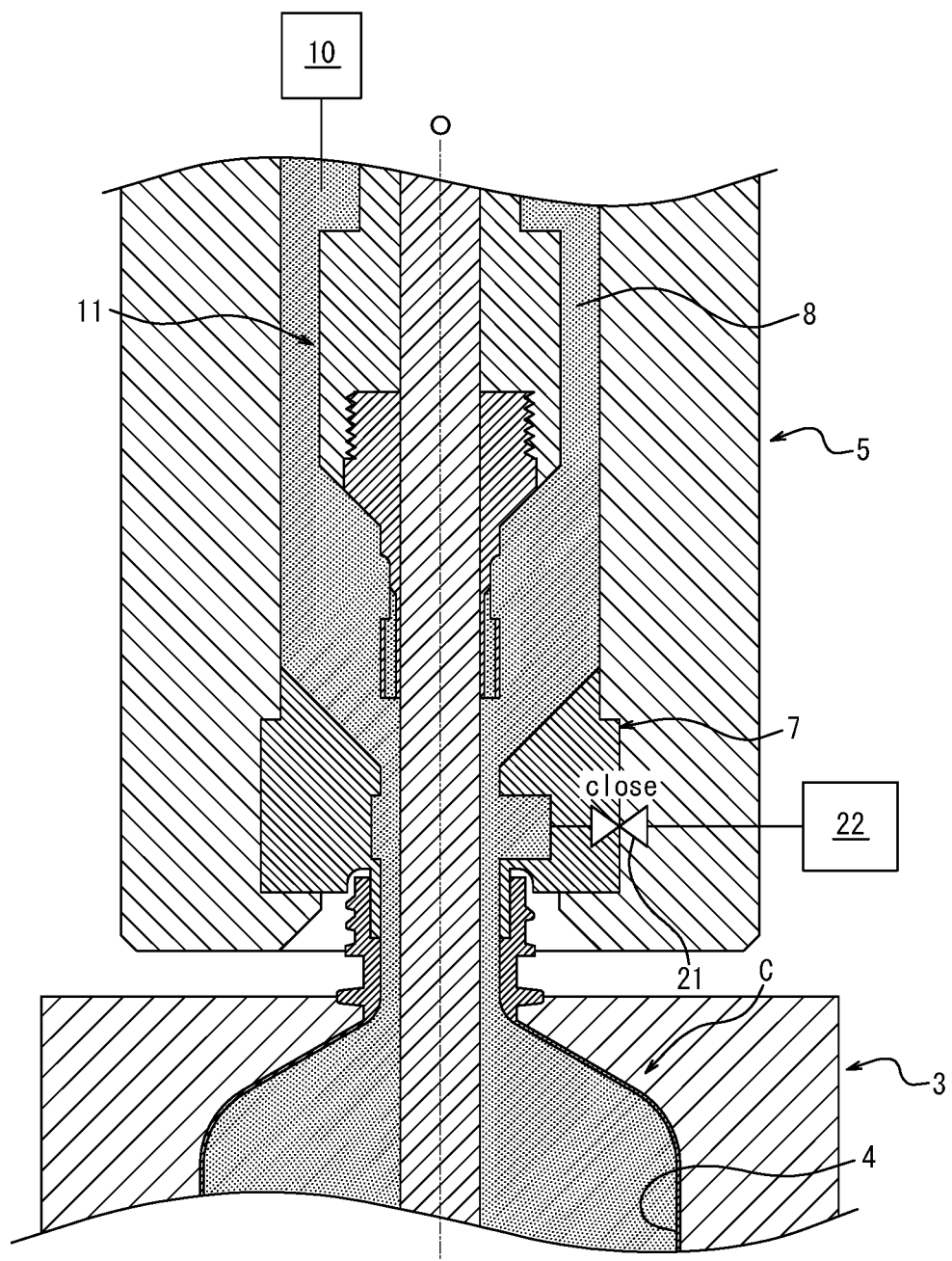
FIG. 2 is a lengthwise sectional view of a blow molding device of FIG. 1 in a state during blow molding.

As illustrated in FIG. 1, a blow molding device 1 according to an embodiment of the present disclosure is used to blow mold a closed-bottom tubular-shaped preform 2, which includes a mouth 2a, into a container C (which may be referred to in FIG. 2). The blow molding device 1 includes a mold 3, in which the preform 2 may be placed. Although only partially illustrated in the figure, the mold 3 has a bottle-shaped cavity 4, which is open at an upper surface of the mold 3. The preform 2 is placed in the mold 3 in an upright position, with the mouth 2a being positioned on an upper side. When the preform 2 is placed in the mold 3, the mouth 2a protrudes upward from the cavity 4. Although not illustrated in details, the mold 3 may be opened into left and right mold halves, and the molded container C may be removed from the mold 3 by opening the mold 3.

Examples of the preform 2 may include a closed-bottom tubular-shaped preform that has been formed, for example, by injection molding, compression molding, or extrusion molding a thermoplastic resin material, such as a polypropylene (PP), a polyethylene terephthalate (PET), and a polyethylene (PE), that exhibits stretchability when heated.

Above the mold 3, the blow molding device 1 also includes a nozzle unit 5, which is displaceable in the up-and-down direction relative to the mold 3. The nozzle unit 5 includes a main body block 6. The main body block 6 is formed by a combination of a plurality of members, and a detailed illustration and description thereof is omitted.

The nozzle unit 5 is provided with a tubular-shaped nozzle 7, which is configured to engage to the mouth 2a of the preform 2. The nozzle 7 includes a cylindrical-shaped nozzle tip 7a, whose outer diameter is smaller than an inner diameter of the mouth 2a of the preform 2. The nozzle tip 7a has a lower end surface configured to abut against a stepped portion formed on an inner surface of the mouth 2a of the preform 2. Additionally, the outer diameter of the nozzle tip 7a may be set equivalent to the inner diameter of the mouth 2a of the preform 2, so that an outer circumferential surface of the nozzle tip 7a abuts against an inner circumferential surface of the mouth 2a. By inserting the nozzle tip 7a into the mouth 2a of the preform 2, the nozzle 7 may be engaged to the mouth 2a. The nozzle 7 also includes a grip portion 7b, which is integrally provided on the upper side of the nozzle tip 7a, and is gripped and held at the grip portion 7b by an inner surface of the main body block 6. Additionally, the nozzle 7 may be formed by a steel material, a resin material, or the like.

The nozzle 7 is arranged coaxially with the cavity 4 of the mold 3. Accordingly, by the nozzle unit 5 being displaced downward to a predetermined position, the nozzle tip 7a is inserted into the mouth 2a of the preform 2, which is placed in the mold 3.

The main body block 6 is provided, inside thereof, with a supply path 8, which extends in the up-and-down direction. The supply path 8 connects to the nozzle 7 from above. Furthermore, a pressurized fluid supply source 10 connects to the supply path 8 via a pipe 9. The pressurized fluid supply source 10 is configured to supply, to the nozzle 7, an incompressive fluid that has been pressurized to a predetermined pressure through the pipe 9 and the supply path 8. That is to say, the pressurized fluid supply source 10 is configured to supply, to the preform 2, the pressurized incompressive fluid through the pipe 9, the supply path 8, and the nozzle 7 at the time of blow molding.

Preferable examples of the pressurized fluid supply source 10 used include the one that employs a plunger pump as a pressurizing source. However, the pressurized fluid supply source 10, which only needs to supply to the supply path 8 the incompressive fluid that has been pressurized to a predetermined pressure, may employ any other configuration.

As the incompressive fluid that the pressurized fluid supply source 10 supplies to the nozzle 7, that is, to the preform 2, a relatively highly viscous liquid, such as shampoo and a liquid detergent, may be used. In the present embodiment, the incompressive fluid preferably has a viscosity of 10000 mPa·s or less when being supplied to the preform 2.

Inside the supply path 8, there is provided a tubular-shaped sealing body 11, which is configured to open and close the nozzle 7. The sealing body 11 is configured to be displaceable in the up-and-down direction between a closing position and an opening position. In the closing position, the sealing body 11 abuts against the nozzle 7 from above to close the nozzle 7, while in the opening position, the sealing body 11 is off the nozzle 7 to open the nozzle 7. The sealing body 11 integrally includes a cylindrical-shaped axial body 11a, a cylindrical-shaped large-diameter portion 11b, which is coupled to a lower end of the axial body 11a and which has a greater outer diameter than the axial body 11a, and a cylindrical-shaped tubular wall 11c, which is coupled to a lower end of the large-diameter portion 11b and which has a smaller outer diameter than the large-diameter portion 11b. The large-diameter portion 11b is provided, in the lower end thereof, with an inclined surface 12, which has a conical shape tapering downward.

Part of the large-diameter portion 11b and the tubular wall 11c are constituted by a tip member 13. Additionally, the tip member 13 may be formed by a steel material, a resin material, or the like. The remaining part of the large-diameter portion 11b and the axial body 11a are constituted by a sealing body base 14, which is composed of a plurality of members. A detailed illustration and description of the sealing body base 14 is omitted. The tip member 13 includes a screw portion 13a, which is screw-fitted to the sealing body base 14. Additionally, the sealing body base 14 may be constituted by a single member. Furthermore, the sealing body 11 may be constituted by a single member.

An upper surface of the nozzle 7, i.e., an upper surface of the grip portion 7b of the nozzle 7, has a closed surface 15, which has a conical shape tapering downward. When the sealing body 11 is displaced to the closing position, that is, the lowermost stroke end, and the inclined surface 12, which is provided in the lower end of the large-diameter portion 11b, comes into abutment against the closed surface 15 from above, the sealing body 11 closes the communication between the supply path 8 and the nozzle tip 7a, thereby closing the nozzle 7. On the other hand, when the sealing body 11 is displaced upward from the closing position to the opening position and the inclined surface 12 moves upward off the closed surface 15, the communication between the supply path 8 and the nozzle tip 7a is established, and the nozzle 7 is opened. Additionally, shapes of the inclined surface 12 and the closed surface 15 may be changed appropriately. Furthermore, the nozzle 7 may be configured to be opened and closed by separation and abutment between an outer circumferential surface of the tubular wall 11c and an inner circumferential surface of the nozzle 7.

In response to the nozzle 7 being opened by the sealing body 11 in a state in which the nozzle tip 7a is inserted to the mouth 2a of the preform 2, which is placed in the mold 3, and the pressurized fluid supply source 10 is operated, the pressurized incompressive fluid is supplied into the preform 2 from the pressurized fluid supply source 10 through the nozzle 7. Thus, the preform 2 is blow molded. After the blow molding, the supply of the incompressive fluid to the molded container C may be stopped by closing the nozzle 7 with the sealing body 11.

The blow molding device 1 includes a stretching rod 16, which is surrounded by the sealing body 11 and which is displaceable in the up-and-down direction. The stretching rod 16 is slidably fitted in a hole provided at an axial center of the sealing body 11, so that the stretching rod 16 may be displaced in an axial direction, namely, in the up-and-down direction, relative to the sealing body 11. At the time of blow molding, the stretching rod 16 may be displaced downward relative to the sealing body 11. By doing so, the preform 2, which is placed in the mold 3, is stretched by the stretching rod 16 in the axial (i.e., lengthwise) direction within the cavity 4. This means that the blow molding device 1 is capable of biaxially stretch blow molding the preform 2. The stretching rod 16 has a solid cylindrical shape.

The inner circumferential surface of the nozzle 7 (i.e., the nozzle tip 7a and the grip portion 7b) has a cylindrical shape, and the inner circumferential surface of the grip portion 7b is provided with a ring-shaped groove 17, which extends in a circumferential direction. The outer circumferential surface of the tubular wall 11c of the sealing body 11 may make a sliding contact with the inner circumferential surface of the nozzle 7, and this outer circumferential surface is provided with a ring-shaped groove (i.e., circumferential groove) 18, which extends in the circumferential direction. The groove 18 is configured to face the groove 17 when the sealing body 11 is in the closing position. Additionally, a small gap may be provided between the outer circumferential surface of the tubular wall 11c and the inner circumferential surface of the nozzle 7 to reduce sliding resistance therebetween. The tubular wall 11c is configured such that the outer circumferential surface of the tubular wall 11c faces the inner circumferential surface of the nozzle 7 when the sealing body 11 is in the closing position. The tubular wall 11c is also configured such that a lower end of the tubular wall 11c is positioned flush with the lower end of the nozzle tip 7a when the sealing body 11 is in the closing position.

The tip member 13 of the sealing body 11 has an inner circumferential surface that may make a sliding contact with an outer circumferential surface of the stretching rod 16. Additionally, a small gap may be provided between the inner circumferential surface of the tip member 13 and the outer circumferential surface of the stretching rod 16 to reduce sliding resistance therebetween.

The blow molding device 1 is provided with a drawing-in mechanism configured to prevent the incompressive fluid from dripping down from the stretching rod 16, the sealing body 11, and the nozzle 7 after blow molding. The drawing-in mechanism includes a plurality of drawing-in holes 19, which is provided in the tubular wall 11c, a drawing-in path 20, which is provided in the nozzle 7, and a fluid drawing-in source 22, which is connected to the drawing-in path 20 via an opening-closing valve 21.

Figure 4A:
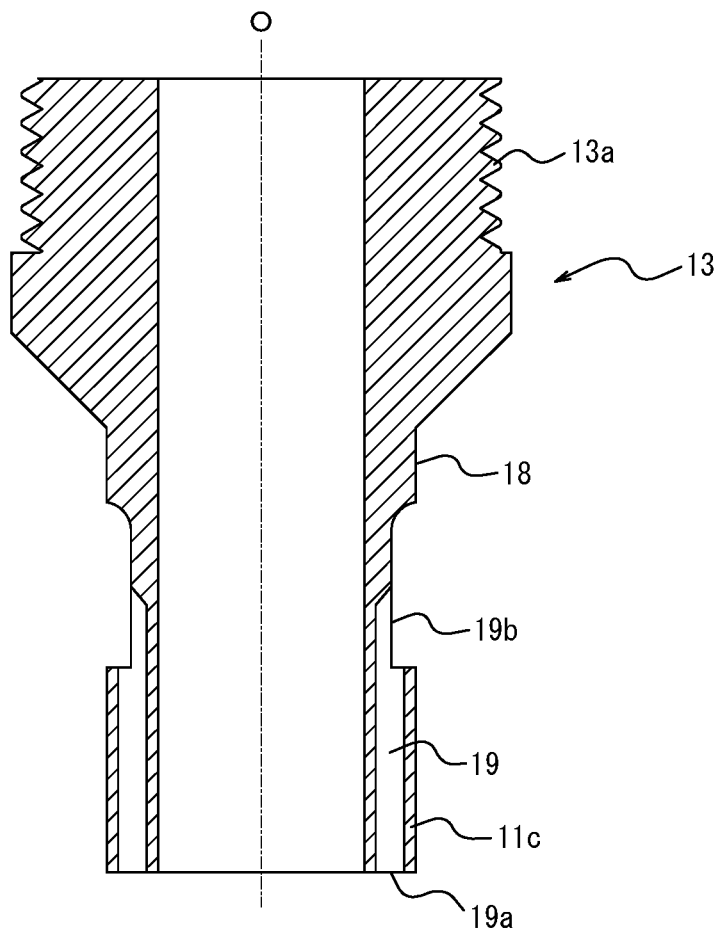
FIG. 4A is a lengthwise sectional view of a tip member of a sealing body in a blow molding device of FIG. 1.
Figure 4B:
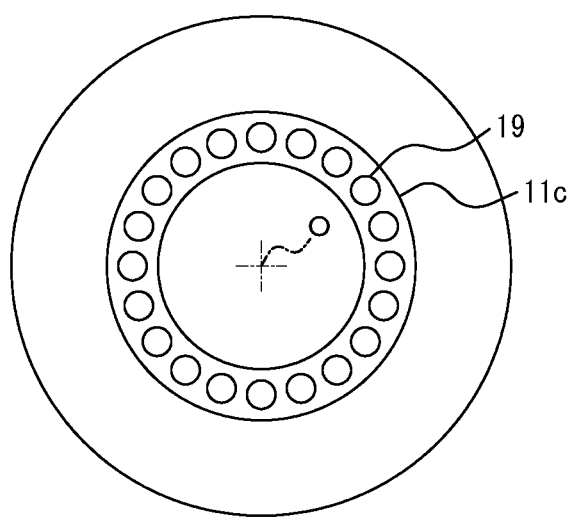
FIG. 4B is a bottom view of a tip member of FIG. 4A.

As illustrated in FIG. 4B, the twenty drawing-in holes 19 are provided at an equal interval in the circumferential direction. However, the number of the drawing-in holes 19 may be changed appropriately, and it is even possible to provide only the single drawing-in hole 19. Furthermore, the plurality of drawing-in holes 19 does not necessarily need to be provided at an equal interval in the circumferential direction. As illustrated in FIG. 4A, each of the plurality of drawing-in holes 19 extends from one end 19a, which is open at the lower end of the tubular wall 11c, to another end 19b, which is open at the outer circumferential surface of the tubular wall 11c. Furthermore, each of the plurality of drawing-in holes 19 extends linearly in the up-and-down direction. However, each drawing-in hole 19 may, for example, extend linearly and obliquely with respect to the up-and-down direction or extend in a curved shape. Furthermore, each drawing-in hole 19 has a circular cross section. However, the cross-sectional shape of each drawing-in hole 19 is not limited to a circle and may be, for example, a polygon. The other end 19b of each drawing-in hole 19 is open to the aforementioned ring-shaped groove 18, which is provided on the outer circumferential surface of the tubular wall 11c.

As illustrated in FIG. 1, the drawing-in path 20 includes the aforementioned ring-shaped groove 17 and a lateral hole 23, which extends on an outer side in the radial direction from the groove 17. The drawing-in path 20 is configured to communicate with the other ends 19b of the plurality of drawing-in holes 19 when the sealing body 11 is in the closing position. The fluid drawing-in source 22 connects to the lateral hole 23 via the opening-closing valve 21. Although the opening-closing valve 21 is preferably provided inside the nozzle unit 5, the opening-closing valve 21 may also be provided outside the nozzle unit 5. The opening-closing valve 21 is constituted by an electric control valve and may be controlled to open and close by a control unit which is not illustrated. However, the opening-closing valve 21 may also be constituted by a pneumatic, hydraulic, or any other control valve.

The fluid drawing-in source 22 is constituted, for example, by a vacuum pump and is configured, when the opening-closing valve 21 is opened, to draw in the incompressive fluid from the drawing-in path 20. Accordingly, when the sealing body 11 is in the closing position and when a lower end of the stretching rod 16 is positioned substantially flush with the nozzle tip 7a and the tubular wall 11c, the fluid drawing-in source 22 draws in the incompressive fluid adhered to the lower ends thereof through the plurality of drawing-in holes 19 and the drawing-in path 20, thereby preventing the incompressive fluid from dripping down.

Next, an illustration is given of an exemplary procedure of blow molding the preform 2 with use of the above-described blow molding device 1.

Firstly, as illustrated in FIG. 1, the preform 2 is placed in the mold 3 in the state in which the sealing body 11 is in the closing position and the nozzle 7 is closed. Subsequently, the nozzle unit 5 is displaced downward, and the nozzle tip 7a is inserted into the mouth 2a of the preform 2. At this time, the stretching rod 16 is in an original position in which the lower end thereof is positioned flush with the lower end of the tubular wall 11c of the sealing body 11.

Subsequently, the sealing body 11 is displaced to reach the opening position, and the nozzle 7 is opened. In response to the nozzle 7 being opened, the pressurized incompressive fluid is supplied into the preform 2 from the pressurized fluid supply source 10 through the supply path 8 and the nozzle 7. Thus, the preform 2 is (liquid) blow molded by the supplied incompressive fluid. Besides, at the time of the blow molding, the stretching rod 16 is displaced downward, and the preform 2 is stretched in the axial (i.e., lengthwise) direction by the stretching rod 16. The biaxial stretch blow molding as described above is performed to mold the preform 2 into the container C, which has the bottle shape conforming to the cavity 4 of the mold 3, as illustrated in FIG. 2.

Figure 3:
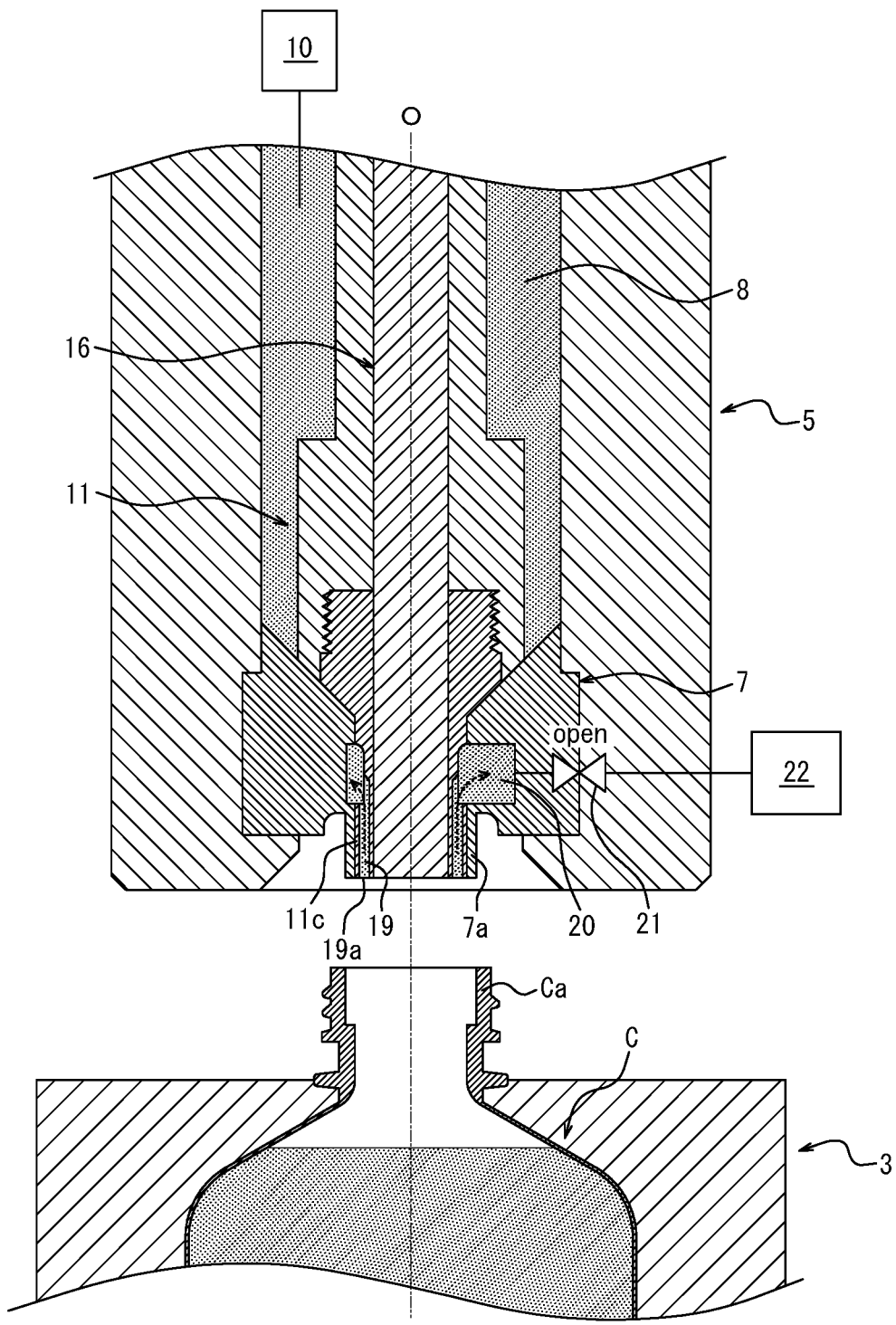
FIG. 3 is a lengthwise sectional view of a blow molding device of FIG. 1 in a state in which a nozzle is disengaged from a blow molded container.

Upon completion of the blow molding, the sealing body 11 is displaced downward to reach the closing position, the nozzle 7 is closed to stop the supply of the incompressive fluid, and the stretching rod 16 is displaced upward to reach the original position, that is, the position in which the lower end thereof is positioned flush with the lower end of the tubular wall 11c of the sealing body 11. Then, as illustrated in FIG. 3, the nozzle unit 5 is displaced upward, and the nozzle tip 7a is disengaged upward from the mouth Ca of the container C. At this time, since the stretching rod 16 is displaced upward and withdrawn from the incompressive fluid inside the container C, a head space corresponding to a volume of the withdrawn stretching rod is created inside the container C. However, the head space may be created by any other method. Additionally, the stretching rod 16 may be used to create the head space, not to perform the biaxial stretching.

Furthermore, after the completion of the blow molding, the opening-closing valve 21 is opened, and the fluid drawing-in source 22 is activated. Accordingly, as illustrated in a dashed arrow in FIG. 3, the incompressive fluid adhered to the lower ends of the nozzle tip 7a, the tubular wall 11c, and the stretching rod 16 is drawn in through the plurality of drawing-in holes 19 and the drawing-in path 20. When being displaced upward after the blow molding, the stretch rod 16 is stroked by the tubular wall 11c. This causes the incompressive fluid adhered to the outer circumferential surface of the stretching rod 16 to accumulate in the lower end of the stretching rod 16. However, since in the present embodiment the one end 19a of each of the plurality of drawing-in holes 19 is provided at the lower end of the tubular wall 11c, which is positioned adjacent to the lower end of the stretching rod 16, the incompressive fluid is drawn in effectively.

Thus, since in the blow molding device 1 the one end 19a of each of the plurality of drawing-in holes 19 is provided at the lower end of the tubular wall 11c, the incompressive fluid adhered to the lower ends of the nozzle tip 7a, the tubular wall 11c, and the stretching rod 16 is effectively drawn in through the plurality of drawing-in holes 19, and therefore, the incompressive fluid is prevented from dripping down from the nozzle 7. Accordingly, the incompressive fluid is prevented from adhering to the molded container C and the mold 3. Especially, even when a relatively highly viscous liquid, such as shampoo and a liquid detergent, is used as the incompressive fluid, the blow molding device 1 prevents the dripping of the liquid and also prevents an increase in cycle time for efficient blow molding.

Next, a description is given of a modification of the blow molding device 1.

Figure 5A:
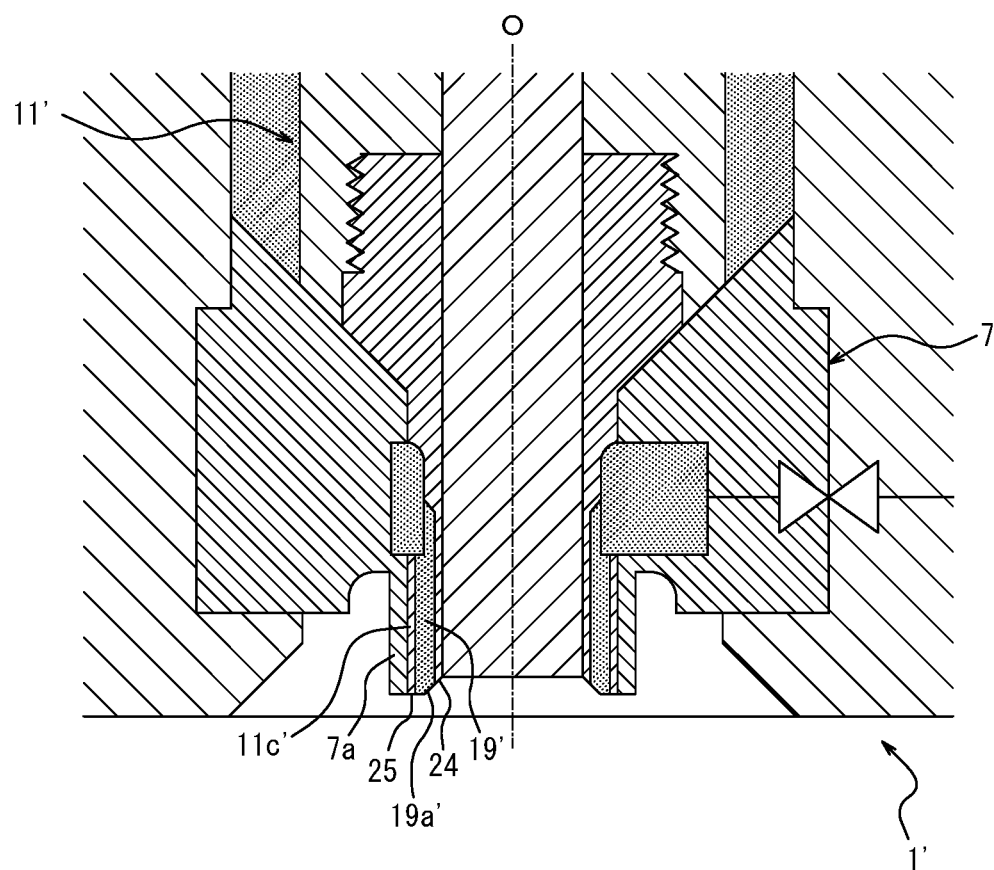
FIG. 5A is a lengthwise sectional view illustrating a modification of a blow molding device of FIG. 1.
Figure 5B:
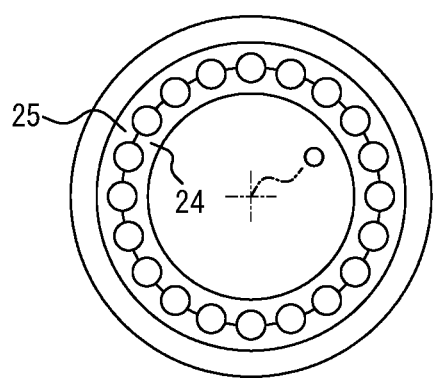
FIG. 5B is a bottom view of part of a blow molding device of FIG. 5A.

As illustrated in FIGS. 5A and 5B, in a blow molding device 1' according to the present modification, a portion of the lower end of the tubular wall 11c' that is located on the inner side in the radial direction defines a conical-shaped annular inclined surface 24, and another portion of the lower end of the tubular wall 11c' that is located on the outer side in the radial direction defines a ring-shaped annular flat surface 25. The tubular wall 11c' is also configured such that the lower end of the tubular wall 11c' is positioned flush with the lower end of the nozzle tip 7a when the sealing body 11' is in the closing position. The one end 19a' of each of the plurality of drawing-in holes 19' is open to both the annular inclined surface 24 and the annular flat surface 25.

As illustrated in FIG. 5A, the above configuration brings the lower end of the stretching rod 16 into substantial alignment with an inner perimeter of the annular inclined surface 24 in the original position of the stretching rod 16. Accordingly, the incompressive fluid accumulated in the lower end of the stretching rod 16 after blow molding is particularly effectively drawn in through the plurality of drawing-in holes 19'.

Needless to say, the present disclosure is not limited to the above embodiment, and various changes may be made without departing the gist of the present disclosure.

For example, although in the above embodiment the nozzle tip 7a and the tubular wall 11c have a cylindrical shape, the nozzle tip 7a and the tubular wall 11c may have a tubular shape having a polygonal, elliptical, or any other cross sectional shape. Note that, however, when the mouth 2a of the preform 2 has a cylindrical shape, the outer circumferential surface of the nozzle tip 7a preferably has a cylindrical shape. Furthermore, the lower end of the tubular wall 11c may also have an annular inclined surface that inclines upward toward the inner side in the radial direction from an outer perimeter to the inner perimeter thereof.

Furthermore, in the above embodiment, the stretching rod 16 has a solid cylindrical shape. However, the stretching rod 16 may include, inside thereof, a flow path connected to the pressurized fluid supply source 10. In this case, the stretching rod 16 may be constituted, for example, by a cylindrical-shaped outer tube and an opening-closing rod in the form of a poppet valve configured to open and close a lower end of the outer tube. Moreover, the above embodiment may include the pre-fill step, performed prior to blow molding, of filling the incompressive fluid into the preform 2 in advance through such a flow path inside the stretching rod 16. Moreover, the above embodiment may include the suck-back step of sucking back, from the inside of the blow molded container C, the incompressive fluid toward the pressurized fluid supply source 10 through the flow path inside the stretching rod 16. Moreover, to discharge air inside the preform 2 to the outside through the drawing-in holes 19 and the drawing-in path 20 in the pre-fill step, the drawing-in path 20 may be provided with an air discharge path configured to be opened and closed.

Moreover, in the above embodiment, the tubular wall 11c is configured such that the lower end of the tubular wall 11c is positioned flush with the lower end of the nozzle tip 7a when the sealing body 11 is in the closing position. However, the tubular wall 11c may also be configured such that the lower end of the tubular wall 11c is positioned above or below the lower end of the nozzle tip 7a when the sealing body 11 is in the closing position.

REFERENCE SIGNS LIST

1 Blow molding device
2 Preform
2a Mouth
3 Mold
4 Cavity
5 Nozzle unit
6 Main body block
7 Nozzle
7a Nozzle tip
7b Grip portion
8 Supply path
9 Pipe
10 Pressurized fluid supply source
11 Sealing body
11a Axial body
11b Large-diameter portion
11c Tubular wall
12 Inclined surface
13 Tip member
13a Screw portion
14 Sealing body base
15 Closed surface
16 Stretching rod
17 Groove
18 (Circumferential) groove
19 Drawing-in hole
19a One end
19b Another end
20 Drawing-in path
21 Opening-closing valve
22 Fluid drawing-in source
23 Lateral hole
24 Annular inclined surface
25 Annular flat surface
O Central axis line
C Container
Ca Mouth

The invention claimed is:

1. A blow molding device, comprising:
a tubular-shaped nozzle;
a pressurized fluid supply source configured to supply a pressurized incompressive fluid to the nozzle;
a tubular-shaped sealing body configured to be displaced in an up-and-down direction between a closing position in which the sealing body closes the nozzle and an opening position in which the sealing body opens the nozzle; and
a stretching rod surrounded by the sealing body and configured to be displaced in the up-and-down direction, wherein
the sealing body includes a tubular wall having an outer circumferential surface configured to face the nozzle when the sealing body is in the closing position,
the tubular wall is provided with a drawing-in hole extending from one end to another end, the one end being open at a lower end of the tubular wall, and the other end being open at a circumferential groove provided to the outer circumferential surface of the tubular wall,
the nozzle is provided with a drawing-in path configured to communicate with the other end of the drawing-in hole when the sealing body is in the closing position, and
the blow molding device further comprises a fluid drawing-in source configured to draw in the incompressive fluid from the drawing-in path.

2. The blow molding device according to claim 1, wherein the nozzle includes a tubular-shaped nozzle tip, and the lower end of the tubular wall is positioned flush with a lower end of the nozzle tip when the sealing body is in the closing position.

3. The blow molding device according to claim 1, wherein the tubular wall is provided with a plurality of the drawing-in holes arranged at an interval in a circumferential direction.

4. The blow molding device according to claim 3, wherein the nozzle includes a tubular-shaped nozzle tip, and the lower end of the tubular wall is positioned flush with a lower end of the nozzle tip when the sealing body is in the closing position.

5. The blow molding device according to claim 3, wherein the lower end of the tubular wall has an annular inclined surface around an entire circumference thereof, the annular inclined surface being inclined upward toward an inner side in a radial direction.

6. The blow molding device according to claim 5, wherein the nozzle includes a tubular-shaped nozzle tip, and the lower end of the tubular wall is positioned flush with a lower end of the nozzle tip when the sealing body is in the closing position.

7. The blow molding device according to claim 1, wherein the lower end of the tubular wall has an annular inclined surface around an entire circumference thereof, the annular inclined surface being inclined upward toward an inner side in a radial direction.

8. The blow molding device according to claim 7, wherein the nozzle includes a tubular-shaped nozzle tip, and the lower end of the tubular wall is positioned flush with a lower end of the nozzle tip when the sealing body is in the closing position.

* * * * *